United States Patent
Ruettiger

Patent Number: 5,803,358
Date of Patent: Sep. 8, 1998

[54] AIR CONDITIONER FOR MOTOR VEHICLE

[75] Inventor: Anton Ruettiger, Wildflecken, Germany

[73] Assignee: Preh-Werke GmbH & Co. KG, Bad Neustadt, Germany

[21] Appl. No.: 616,010

[22] Filed: Mar. 14, 1996

[30] Foreign Application Priority Data

Mar. 14, 1995 [DE] Germany ............ 195 09 164.7

[51] Int. Cl.⁶ ............ G05D 23/00; H01J 40/14
[52] U.S. Cl. ............ 236/91 C; 250/214 AL; 374/132
[58] Field of Search ............ 236/91 C; 250/214 AL, 250/339.05; 374/132

[56] References Cited

U.S. PATENT DOCUMENTS

| | | |
|---|---|---|
| 4,663,521 | 5/1987 | Maile .............. 250/214 AL |
| 5,400,964 | 3/1995 | Freiberger .............. 236/91 C |

FOREIGN PATENT DOCUMENTS

| | | |
|---|---|---|
| 0 492 324 A2 | 7/1992 | European Pat. Off. . |
| 0492 324 A3 | 7/1992 | European Pat. Off. . |
| 0 521 756 A1 | 1/1993 | European Pat. Off. . |
| 41 13 374 A1 | 10/1991 | Germany . |
| 40 40 846 A 1 | 6/1992 | Germany . |
| 43 05 446 A1 | 8/1994 | Germany . |
| 1010045 | 1/1989 | Japan .............. 236/91 C |

*Primary Examiner*—William E. Wayner
*Attorney, Agent, or Firm*—Griffin, Butler, Whisenhunt & Szipl

[57] ABSTRACT

A regulating apparatus for a motor vehicle air conditioner which automatically influences a cab temperature set by a vehicle operator dependent upon sunshine striking the vehicle, wherein, an intensity of sun rays is determined from, an intensity of daylight brightness and an intensity of an infrared portion of the daylight. The daylight is led to one or more sensors by one or more light conductors.

11 Claims, 2 Drawing Sheets

Daylight Brightness (a) (including infrared b)

AIR CONDITIONER FOR MOTOR VEHICLE

BACKGROUND OF THE INVENTION

Air conditioners for motor vehicles are known in which at least one sunshine (or sun ray) sensor is mounted directly in an irradiated area, on a vehicle roof for example, and a vehicle interior (cab) air temperature is then influenced by the measured sunshine (or sun rays). For example an apparatus is known from German Patent Publication DE-A1-40 40 846 in which at least one sun sensor is coupled with an analyzing device which feeds a delayed signal to a regulator.

Sensors and lead wire for such apparatus are expensive and susceptible to interference.

Because of this, it is an object of this invention to provide a reliable air conditioning unit of the type described in the opening paragraph above for which a sun light sensor with lead wires are not necessary.

SUMMARY OF THE INVENTION

According to principles of this invention, a regulating apparatus for a motor-vehicle air-conditioner automatically influences a cab air temperature set by a vehicle operator dependent upon sun rays striking the vehicle, with the intensity of the sun rays being determined from a daylight brightness and from an infrared portion of the daylight.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
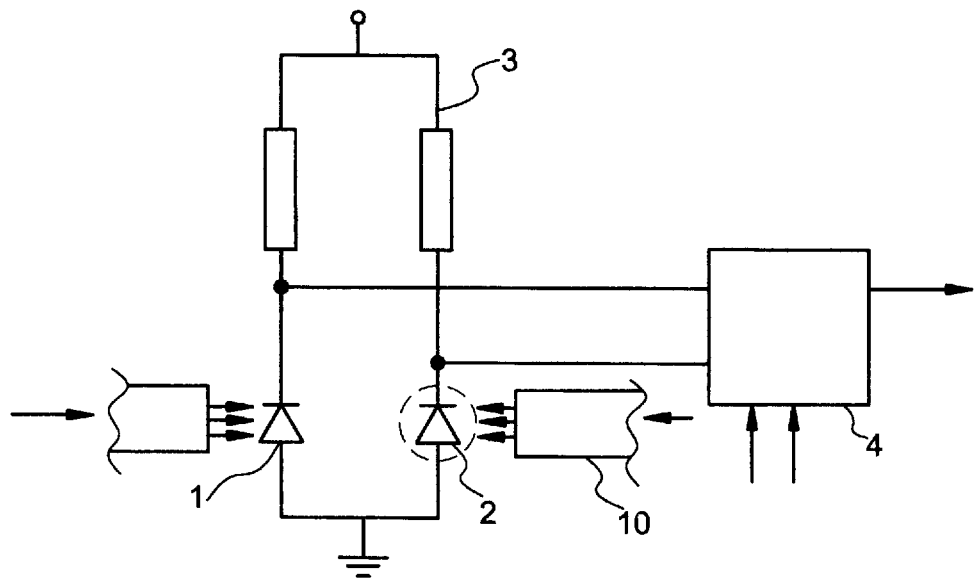
FIG. 1 is a schematic/block diagram of a circuit arrangement which is a part of a regulating apparatus of this invention.

FIG. 1 shows schematically a circuit arrangement as a portion of a regulating unit of an air conditioner for a motor vehicle having a daylight sensor 1 (diode) and an infrared light sensor 2 (formed of a diode and a filter) which are supplied with a voltage over a circuit 3 and whose signals corresponding to daylight brightness and infrared portions of daylight are continuously fed to an electronic control device 4 and, according to performance graphs, characteristic curves and operation programs stored in the control device, effect an increase or a decrease in a set cab temperature.

Figure 2:
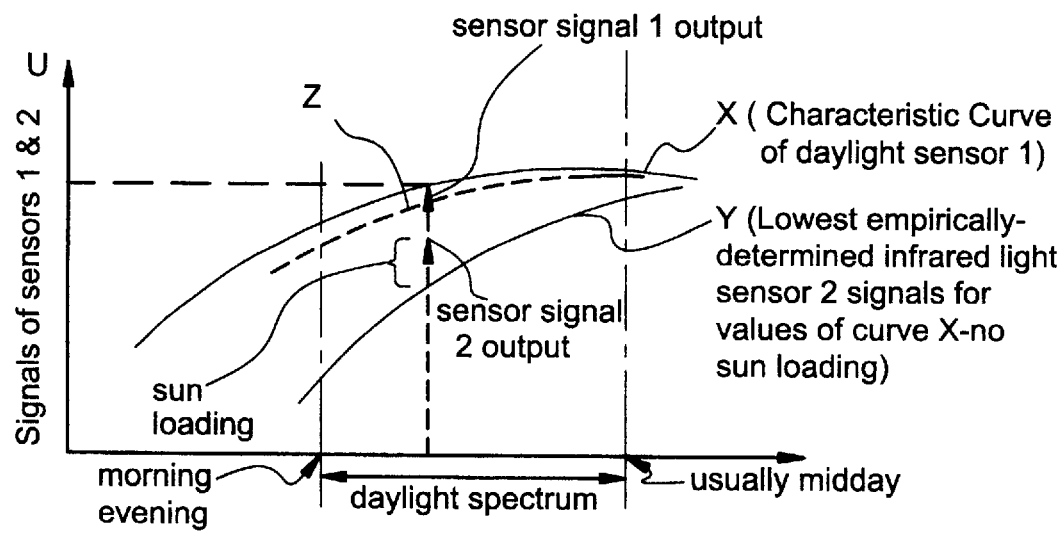
FIG. 2 is a diagrammatic representation of characteristic curves employed in a daylight sensor of this invention.

Accordingly, FIG. 2 is a diagram with an axis for daylight brightness (a) including infrared light (b) and an axis for actual daylight and infrared light sensor signals (U), showing a characteristic curve X thereon of the daylight sensor, 1 with two vertical dot-dash lines marking a daylight spectrum between bright and dark.

The diodes of the sensors 1,2 have characteristic, or standard, deviations curves (which are usually provided by manufacturers). Thus, the lowest infrared light sensor 2 signals over the daylight characteristic curve X are empirically, or adaptively, determined and stored as values of the characteristic curve Y, representing daylight without a sun loading, as shown in FIG. 2. Using this, actual sensor signals are quantitatively determined and placed in relationship to the difference between the daylight characteristic curve X and the lowest infrared characteristic curve Y. That portion of the infrared sensor 2 signal which exceeds the Y curve at a daylight brightness position where the daylight sensor 1 signal intersects the X curve provides an indication of sun loading. Thus, FIG. 2 shows how readings from a daylight sensor and a infrared sensor are combinable to determine sun loading for a given daylight brightness.

To do this, it is beneficial to combine the sensor signals of the daylight (a) and the infrared light (b) in a relationship (a/b), and to place the result, as a factor dependent on the daylight (a), in a performance graph stored in a storage element of the control device 4 for determining a correction value (c).

Figure 3:
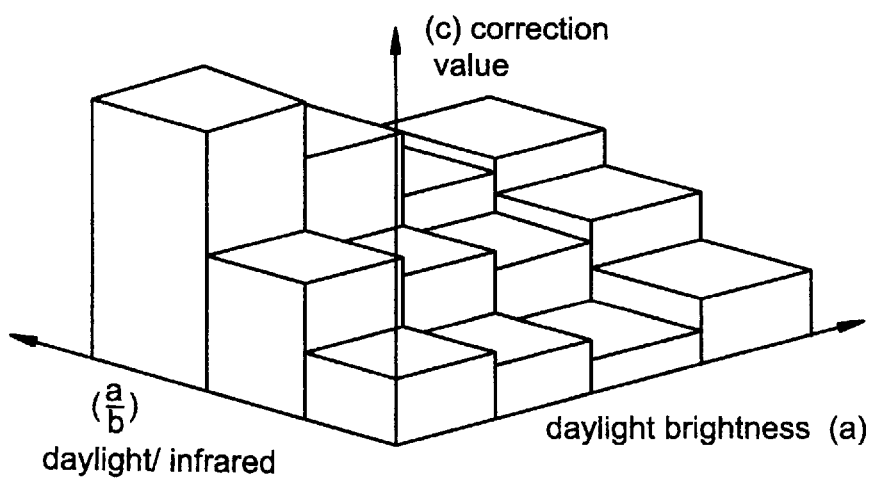
FIG. 3 is a three dimensional representation of stored performance graph values, having a daylight axis (a), a daylight/infrared ratio axis (a/b), and a correction value axis (c)

FIG. 3 depicts schematically such a performance graph stored in the storage element having axes for daylight (a), daylight/infrared ratio (a/b) and a correction value (c).

It can be beneficial if the highest measured infrared light sensor signals, are recorded in the same way, for example as the dashed line Z in FIG. 2, and stored as a characteristic curve, which can be valued as the characteristic curve for daylight with the highest sunshine loading. In this manner, actual sensor signals can be placed in relationship with a difference between the highest and lowest infrared light characteristic curves for developing correction values as a function of this.

Compensation can thereby be made for standard deviations as well as for differences in sensor signals due to different interior decors and colors of vehicle interiors.

A correction value can likewise be placed into the characteristic curve empirically, or by adaption; for example by a motor vehicle operator who adjusts a temperature to switch to set, for a given sunshine intensity, a vehicle interior (cab space) temperature to his subjective comfort.

Figure 4:
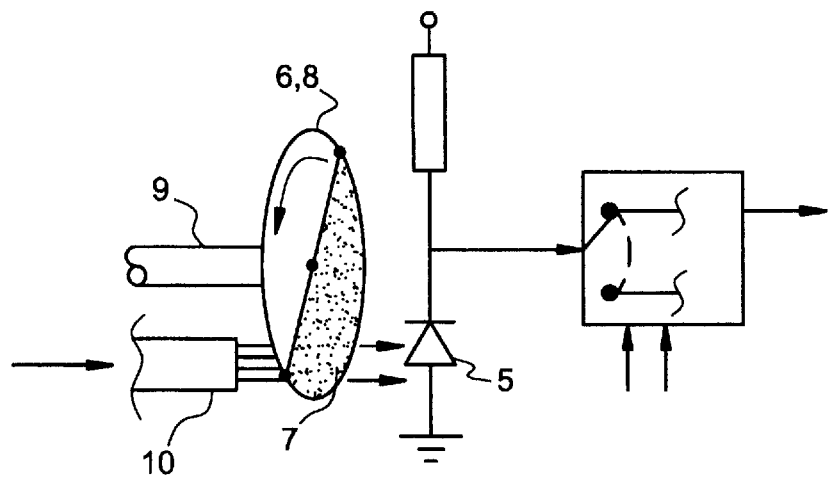
FIG. 4 is a schematic/block diagram of a second embodiment regulating apparatus of a portion of this invention.

In an alternative embodiment of FIG. 4 it is provided that daylight and infrared light signals are created by a single daylight sensor 5 which takes synchronized, phased, measurements with and without an infrared light filter; a rotating filter disk 6, having filter and non-filter segments 7, 8 being used as a switch, with the filler disk 6 being driven by an air wheel, or impeller, 9.

Both embodiments have light conductors 10 over which daylight is fed to the regulating unit. Thus, the regulating unit can be arranged in an area of the motor vehicle's dashboard.

Overall, the apparatus of this invention provides an arrangement which is cost effective to manufacture and which is suitable for motor vehicle use.

While the invention has been particularly shown and described with reference to a preferred embodiment, it will be understood by those of ordinary skill in the art that various changes in form and detail may be made therein without departing from the spirit and scope of the invention.

Although air conditioning units with sun sensors are well known such sun sensors, as well as their necessary electrical leads, are expensive and subject to damage. Contrary to most prior art systems, this invention determines sun ray intensity in terms of daylight brightness and an infrared portion thereof. This invention provides an embodiment which is cost effective to manufacture and which is suitable for motor vehicles.

The invention claimed is:

1. A regulating apparatus for a motor-vehicle air conditioning system which automatically influences a cab temperature set by a vehicle operator dependent upon sunshine striking the vehicle, wherein, the regulating apparatus includes a daylight measuring means for measuring daylight brightness and an intensity of an infrared portion of daylight and a control means for influencing the cab temperature as a function of the daylight brightness and the intensity of the infrared portion of the daylight.

2. A regulating apparatus as in claim 1 wherein said daylight measuring means includes at least one light sensor and wherein said control means stores performance curves, characteristic curves, and operational programs with which it compares output signals of said light sensor and accordingly influences said cab temperature.

3. A regulating apparatus as in claim 2 wherein the control means has the function of placing values of the output signals representative of daylight brightness (a) and of the intensity of the infrared light (b) in a relationship (a/b), and of comparing the result with a stored performance graph to determine a cab-temperature correction value as a function of the daylight brightness and the intensity of the infrared light.

4. A regulating apparatus as in claim 2 wherein one of the characteristic curves Y stored by the control means is a plot of the smallest infrared light sensor signals Y over a daylight characteristic curve X, which represents daylight without sunshine loading, so that actual sensor signals can be quantitatively compared with a difference between the daylight characteristic curve X and the smallest infrared light characteristic curve Y, whereby a result is placed in the performance graph for determining a correction value (c) for influencing the cab temperature as a function of the daylight sensor signal.

5. A regulating apparatus as in claim 2 wherein two of the characteristic curves Y and Z stored by the control means are respectively plots of the smallest and largest infrared light sensor signals over a day light characteristic curve X, which respectively represent daylight which causes the least and greatest sunshine loading, so that actual sensor signals can be quantitatively determined from the smallest characteristic curve Y, and compared to a difference between the smallest and largest characteristic curves for producing a performance graph for determining a correction value (c) as a function of the daylight (a) sensor signal.

6. A regulating apparatus as in claim 3 wherein the correction value can be read by using the performance graph.

7. A regulating apparatus as in claim 1 wherein said daylight measuring means is a single sensor having a synchronized measuring means for placing an infrared light filter into and out of a light path for producing the daylight and the infrared light signals.

8. A regulating apparatus as in claim 7 wherein said synchronized measuring means includes a rotating filter disk having a filter section and a non-filter section for rotating to switch measuring phases.

9. A regulating apparatus as in claim 8 wherein said filter disk comprises an airflow impeller.

10. A regulating apparatus as in claim 1 wherein daylight to be sensed is led to said daylight measuring means via at least one light conductor.

11. A regulating apparatus as in claim 10 wherein the daylight measuring means comprises at least two sensors integrated into a common unit and arranged in an area of a motor vehicle dashboard.

* * * * *